United States Patent
Lehner et al.

(10) Patent No.: US 6,439,198 B2
(45) Date of Patent: Aug. 27, 2002

(54) METHOD FOR DETECTING COMBUSTION MISFIRES IN AN INTERNAL COMBUSTION ENGINE

(75) Inventors: Michael Lehner, Muehlacker; Andrea Lohmann, Stuttgart; Stephan Uhl, Moeglingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/797,953

(22) Filed: Mar. 5, 2001

(30) Foreign Application Priority Data

Mar. 3, 2000 (DE) ......................................... 100 10 459

(51) Int. Cl.$^7$ ................................................. F02P 5/15
(52) U.S. Cl. ................... 123/436; 123/406.24; 701/111
(58) Field of Search .................... 123/406.2, 406.24, 123/436; 701/111

(56) References Cited

U.S. PATENT DOCUMENTS

| | | | |
|---|---|---|---|
| 5,691,469 A | * 11/1997 | Mezger et al. | 123/436 |
| 5,875,411 A | * 2/1999 | Volkart et al. | 123/436 |
| 5,893,897 A | * 4/1999 | Volkart et al. | 123/436 |
| 5,979,407 A | * 11/1999 | Wang et al. | 123/436 |
| 6,230,095 B1 | * 5/2001 | Wang | 701/111 |

FOREIGN PATENT DOCUMENTS

DE          4138765          7/1992

* cited by examiner

*Primary Examiner*—Erick Solis
(74) *Attorney, Agent, or Firm*—Walter Ottesen

(57) ABSTRACT

The invention relates to a method for combustion misfire detection in multi-cylinder internal combustion engines. In the method, rough-running values for each cylinder of the engine are determined individually for each crankshaft rotation by measuring the segment times. The segment times include the times corresponding to the piston movement of each cylinder to be measured during which times the crankshaft passes through a corresponding circular segment angular region and, on the basis of filtered rough-running values, equalization or corrective factors are computed for each cylinder in an evaluation unit for influencing injection times or injection time points of each individual cylinder. The determined rough-running values (LUT) or the filtered rough-running values (FLUT) are compared in a desired value comparison to a threshold value ($SW_2$) which is pregiven in value significantly less than the threshold value ($SW_1$) for misfire detection. A reduction of the threshold value ($SW_1$) for misfire detection to a lower level is effected by the continuous dropping below the second threshold value ($SW_2$) within a pregiven time interval ($\Delta t$) or during a specific number of engine revolutions ($\Delta u$).

7 Claims, 1 Drawing Sheet

METHOD FOR DETECTING COMBUSTION MISFIRES IN AN INTERNAL COMBUSTION ENGINE

BACKGROUND OF THE INVENTION

Methods for detecting combustion misfires are utilized in spark-injection engines in order, on the one hand, to detect an uneven running of the engine and to minimize this uneven running by suitable control arrangements while, on the other hand, most of all, to avoid a deterioration of the exhaust-gas values caused by misfires and to protect the exhaust-gas catalytic converter. The uneven running of the engine can be caused, for example, by valve coking or by quality scattering of characteristic values of the injection valves for direct injection.

Methods of this kind utilize the recognition that a non-occurring combustion within a cylinder of an engine is associated with characteristic changes of the torque trace of the engine compared to the normal operation. One can distinguish between normal operation of the engine without misfires and an operation with misfires via the comparison of the torque traces. An operation with misfires in one or several cylinders contributes to the total torque course of the engine with a lesser contribution and this contribution can be determined from a detection of the actual torques of the cylinders via an evaluation of the time-dependent trace of the crankshaft rotation or camshaft rotation.

In a known method, a specific region of the piston movement of each cylinder is assigned a crankshaft angle region identified as a segment. The segments, which belong to each cylinder are, for example, realized by markings on a transducer wheel coupled to the crankshaft. The segment time, that is, the time in which the crankshaft passes through the corresponding angular region of the segment, is essentially dependent upon the energy converted in the combustion stroke. Misfires lead to an increase of the ignition-synchronously detected segment times as a consequence of the insufficient torque contribution. These detected segment times are determined for each cylinder by scanning the markings on the transducer wheel via a suitable sensor. The more even the engine runs, the lesser are the differences between the segment times of the individual cylinders.

A method is disclosed, for example, in German patent publication 4,138,765 (corresponding to U.S. patent application Ser. No. 07/818,884, filed Jan. 10, 1992, now abandoned) wherein an index for the rough running of the engine is computed from differences of the segment times and wherein general conditions, for example, the increase of the engine rpm in a vehicle acceleration, are compensated by computation. The rough-running value which is computed in this manner for each ignition is, in a next method step, ignition-synchronously compared to a threshold value in a desired value comparison. If the determined rough-running value exceeds the threshold value, which is dependent, if required, on operating parameters such as load and rpm, then this is evaluated as a misfire of the particular cylinder. If misfires are determined, a suitable warning device can provide an indication of this irregularity when a certain misfire rate is exceeded.

Alternatively, and in a further method step, a cylinder equalization can take place after detection of the misfire operation. For this purpose, equalization or corrective factors are formed individually for each cylinder in an evaluation unit and, with the aid of these factors, injection times or ignition time points of the individual cylinders, which are affected by the misfires, can be influenced. Thus, a change of the ignition time point can, for example, eliminate the incomplete combustion of the gas mixture within a cylinder so that this cylinder again can provide the full contribution to the total torque of the engine. Furthermore, the differences in the injection performance of injection valves can be compensated by influencing the injection times and the injection duration.

From the foregoing, it becomes clear that a reliable detection of engine misfires contributes to compliance with statutory provisions and the detection of engine defects. The detection is dependent, inter alia, essentially on the desired value comparison of the determined rough-running values with the pregiven threshold values. Depending upon the setting of this threshold value, a reliable detection of misfires takes place or individual misfires are not detected. Accordingly, the setting of the threshold values for the determined rough-running values by the engine manufacturer is of great significance because, only by recognizing misfire operation, can a corresponding adaptation of injection times and ignition time points take place and the rough-running values can be reduced or the vehicle user can be made aware of an engine defect.

SUMMARY OF THE INVENTION

The method of the invention for detecting combustion misfires in multi-cylinder engines affords the advantage with respect to the known state of the art that the detection quality of combustion misfires is significantly improved so that a considerably better assurance is provided as to erroneous detections of misfires, that is, an assurance is provided against normal combustions being evaluated as combustion misfires. This advantage is achieved in that the determined rough-running values LUT or filtered rough-running values FLUT are compared in a desired value comparison to a threshold value $SW_2$, which is pregiven in value considerably less than the threshold value $SW_1$ for detecting misfires. A reduction of the threshold value $SW_1$ for detecting misfires to a lower level results when there is a persistent drop below the second threshold value $SW_2$ within a pregiven time interval $\Delta t$ or during a specific number of engine revolutions $\Delta u$.

With this feature of the invention, the equalization of cylinders (that is, the smooth running of the engine) is utilized to increase the disturbance intervals of the misfire detection. More specifically, the equalization is achieved as a consequence of influencing the combustion operations in individual cylinders by changing injection times and ignition time points for these cylinders. The relevant threshold value, which is applied to detect misfires, can be adjusted to be so sensitive that as many misfires as possible are detected. This sensitivity is achieved because of the smaller rough-running values which are determined over a longer time span. Accordingly, for a relatively good smooth running of the engine (that is, at low rough-running values), the threshold value does not have to be insensitive as is usual in the state of the art which causes a poor detection quality of the combustion misfires to result.

In connection with the change of the threshold value necessary to detect combustion misfires, it has been shown to be especially practical to set this threshold value to the value of an available lower threshold value stored in the control system. This affords advantages especially for programming the electronic evaluation circuits.

Furthermore, it has been shown to be advantageous that exceeding the threshold value $SW_2$ effects a raising of the threshold value $SW_1$. Notwithstanding a continuously executed equalization of cylinders, it cannot be precluded that, for special reasons, individual cylinders temporarily provide a changed contribution to the overall torque of the engine. For this reason, an erroneous estimate of combustion misfires is avoided by the measures described. The resetting effects essentially a reestablishment of the method parameters to the start of the "learn effect" of the method of the invention and leads to the situation that a reduction of the threshold value for combustion misfire detection can take place when the cylinder equalization again brings about an increased smooth running of the engine. This is achieved with a renewed comparison of the rough-running values to the lower threshold value with the comparison being carried out over a certain time span.

The threshold value is purposefully reset to the original value established at the start of the method.

For specific areas of application, it can be advantageous to carry out the reduction of the threshold value for combustion misfire detection to a lower level in several stages. The individual threshold values lie between the magnitude of the threshold value for combustion misfire detection and the reduced threshold value. In this way, a slow approach of the combustion misfire detection can take place to an especially low threshold value level and, at the same time, the problem is avoided of evaluating an essentially proper combustion as a combustion misfire because the corresponding threshold value, which is applied as a desired value comparison, is to be viewed as being too sensitive.

For the practical realization of the method as well as a compact configuration of the necessary components, it can be advantageous to store the equalization or corrective factors after each desired/actual comparison of the rough-running values in a precontrol characteristic field and, after reducing the first threshold value to a lower level, the last stored equalization or corrective factors are left unchanged. The equalization or corrective factors are determined for each cylinder individually from the rough-running values. In this way, the precontrol characteristic field contains the equalization or corrective factors, which are necessary for optimal equalization of the individual cylinders, only after a corresponding learn phase, that is, after a time interval in which the rough-running values are at so low a level that, in principle, a misfire-free operation can be assumed.

BRIEF DESCRIPTION OF THE DRAWING

The method of the invention will now be described with respect to the single FIGURE (FIG. 1) of the drawing wherein the sequence of method steps is explained in greater detail with respect to a function block diagram.

Figure 1:
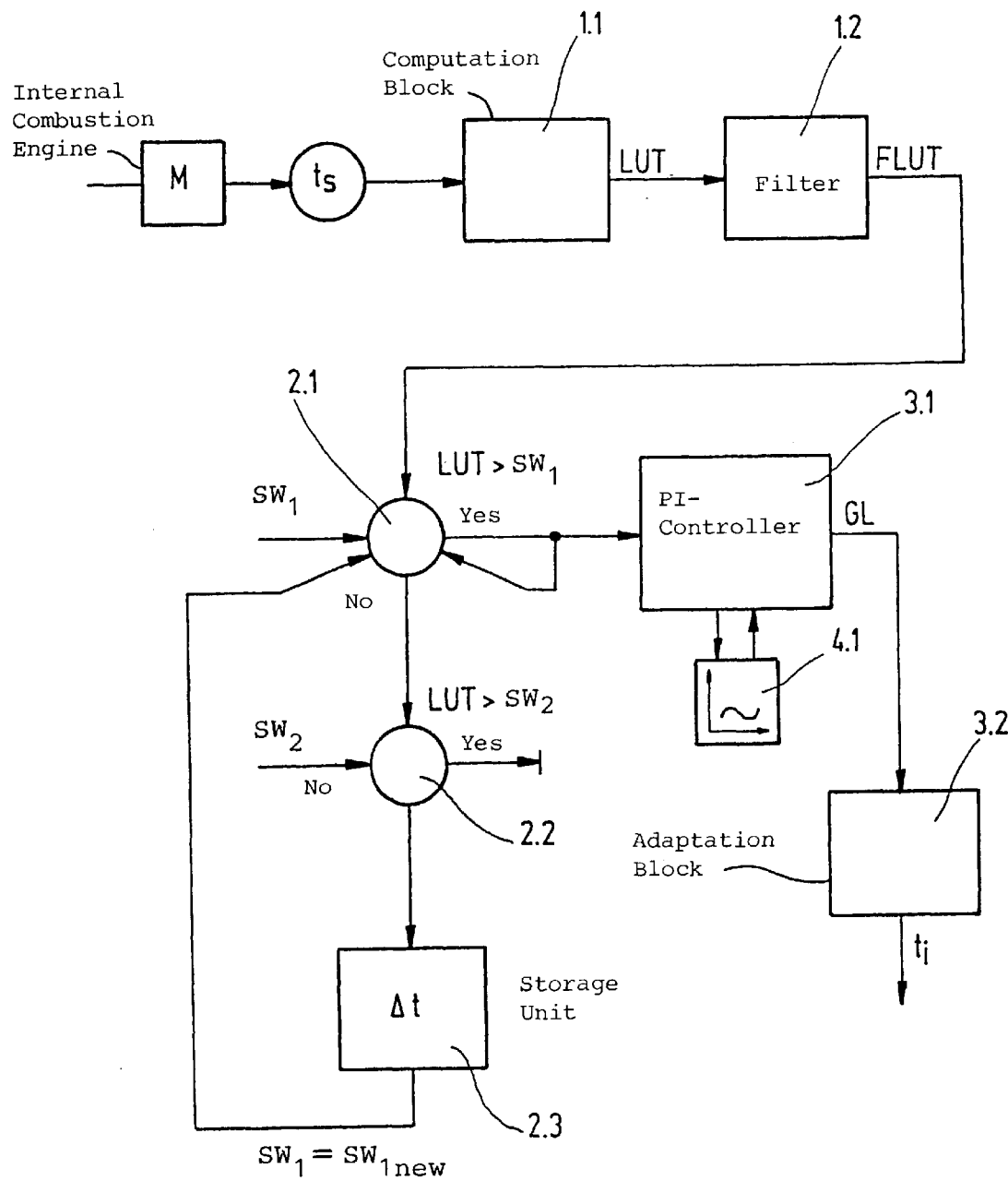

DESCRIPTION OF THE PREFERRED
EMBODIMENTS OF THE INVENTION

The method of the invention is shown in FIG. 1 for one cylinder of a multi-cylinder internal combustion engine by way of example for reasons of clarity. The sequence of the method steps for the remaining cylinders takes place in the same manner as shown in the block circuit diagram.

The engine M is provided with a transducer wheel connected to the camshaft or crankshaft of the engine and individual segments are applied to the transducer wheel. First, a cylinder-individual segment time $t_s$ is determined with the aid of the transducer wheel. This segment time can be lengthened compared to the normal operation of the engine in the event that an incomplete combustion or a combustion misfire takes place in the corresponding cylinder. The segment time $t_s$ is determined via suitable sensors by means of the transducer wheel and is thereafter supplied to a block 1.1. The block 1.1 computes cylinder-individual rough-running values LUT from the segment times. A filter block 1.2 is connected downstream of the block 1.1 and the determined rough-running values LUT are subjected to filtering in the filter block 1.2.

The rough-running values LUT are subjected to a desired value comparison to a threshold value $SW_1$, in a block 2.1. If the desired value comparison yields that the rough-running value LUT is greater than the threshold value $SW_1$, then misfires are detected. The filtered rough-running values FLUT are computed in block 1.2 by filtering the rough-running value LUT and are a direct index for the control deviation of the cylinder equalization. The FLUT values are transmitted to a PI-controller 3.1 for cylinder equalization.

The PI controller 3.1 determines, in stratified operation, equalization or corrective factors GL for the affected cylinder from the control deviation. The equalization or corrective values GL are supplied as output quantities of the block 3.1 to a further block 3.2 which undertakes an adaptation of the injection time and/or of the ignition time point of the cylinders whose FLUT values indicate a control deviation in order to effect a return of the cylinder operation to the normal state. To this extent, the method steps explained above correspond to the methods for cylinder equalization known from the state of the art.

If the desired value comparison of the rough-running value LUT with the threshold value $SW_1$ shows that the rough-running value LUT lies below the threshold value level, then this is evaluated as a misfire-free operation. The method of the invention is characterized in that a desired value comparison in an evaluation unit 2.2 is undertaken after carrying out the desired value comparison of LUT with $SW_1$. An inquiry takes place in evaluation unit 2.2 as to whether the cylinder-individual determined rough-running value LUT is less than a pregiven threshold value $SW_2$. If the rough-running value LUT is less than the pregiven threshold value $SW_2$, then the result is supplied to a storage unit 2.3. This storage unit is provided with a time span count value $\Delta T$.

In addition to storing the desired/actual value comparison results $E_1$, $E_2$, et cetera, the block 2.3 has the task of deciding whether all rough-running values LUT were below the threshold value $SW_2$ during the time span $\Delta t$ or during a specific number of revolutions $\Delta u$ and whether, at the same time, the engine was in an operating range in which misfires could be detected with certainty by means of the threshold value $SW_1$. If this inquiry is positive, then the outputted torques of the individual cylinders are deemed as equalized. In this case, the originally set threshold value $SW_1$ is set within the block 2.1 to a new value which has a lesser value $SW_{1new}$ referred to the level than the original fixed value $SW_1$.

Based on the newly fixed threshold value $SW_{1new}$ the inquiry within block 2.1 as to whether the rough-running values LUT lie below the threshold value $SW_1$ takes place at a much more sensitive level than before the reduction of the threshold value $SW_1$ so that a much more precise misfire detection can take place. If it should result in the context of the engine operation that, because of special circumstances, the rough-running values LUT exceed the level of the threshold value $SW_2$ and, at the same time, the engine is in an operating range in which misfires can be detected with certainty by means of the original threshold value $SW_1$, then the threshold value $SW_{1new}$, which is at a low level, is reset to its original value $SW_1$. In this way, the method of the invention runs with the originally set values until again, after elapse of a time span ΔT, a reduction of the threshold value $SW_1$ takes place. In the time span ΔT, the computed rough-running values LUT lie below the level of the second threshold value $SW_2$ and, at the same time, the engine is in an operating region in which misfires can be detected with certainty by means of the original threshold value $SW_1$.

The reduction of the threshold value $SW_1$ can, as described above, also take place in several stages and the individual stage values purposefully lie between the level of the threshold value $SW_1$ and the level of the threshold value $SW_2$. Furthermore, it can be purposeful that the PI controller 3.1 has a precontrol characteristic field 4.1 which is adaptively supplied with values for optimal cylinder equalization. Within the precontrol characteristic field, the cylinder-individual differences are reflected in the high pressure injection valves. After reduction of the threshold value $SW_1$, the precontrol characteristic field has the values GL which are necessary for optimal equalization and which are dependent upon the individual high pressure injection valves.

It is understood that the foregoing description is that of the preferred embodiments of the invention and that various changes and modifications may be made thereto without departing from the spirit and scope of the invention as defined in the appended claims.

What is claimed is:

1. A method for detecting combustion misfires in a multi-cylinder engine wherein, for each crankshaft rotation, segment times elapse during operation of the engine and each segment time corresponds to a piston movement of a cylinder to be measured and is the time in which the crankshaft passes through a circular segment angular region, the method comprising the steps of:

individually determining the rough-running values (LUT) for each cylinder of the engine by measuring the segment times;

detecting combustion misfires on the basis of said rough-running values;

pregiving a first threshold value ($SW_1$) for detecting combustion misfires;

comparing the determined rough-running values (LUT) in a is desired value comparison to a second threshold value ($SW_2$) which is, in value, substantially less than the first threshold value ($SW_1$) pregiven for detecting misfires;

reducing the first threshold value ($SW_1$) to a lower level when:

(a) when there is a regular drop below the second threshold value ($SW_2$) within a pregiven time interval (Δt); or, (b) during a specific number of engine revolutions (Δu).

2. The method of claim 1, comprising the further steps of:

filtering said rough running values (LUT) to obtain filtered rough running values (FLUT);

computing cylinder-individual equalization or correction factors for influencing injection times or ignition time points of the individual cylinders in an evaluation unit on the basis of the filtered rough running values;

comparing the determined rough running values (LUT) or the filtered rough running values (FLUT) in a desired value comparison to a second threshold value ($SW_2$) which is, in value, substantially less than the first threshold value ($SW_1$) pregiven for detecting misfires;

reducing the first threshold value ($SW_1$) to a lower level when:

(a) when there is a regular drop below the second threshold value ($SW_2$) within a pregiven time interval (Δt) ; or, (b) during a specific number of engine revolutions (Δu).

3. The method of claim 2, comprising the further step of decreasing the first threshold value ($SW_1$) pregiven for detecting misfires to the value of the lower second threshold value ($SW_2$).

4. The method of claim 3, wherein an increase of the first threshold value ($SW_1$) for misfire detection is effected by the second threshold value ($SW_2$) being exceeded after the threshold value for detecting misfires is reduced to a lower level by the determined rough running values (LUT, FLUT).

5. The method of claim 4, wherein the threshold value ($SW_1$) for misfire detection is increased to its original value at the start of the method.

6. The method of claim 5, wherein the reduction of the first threshold value ($SW_1$) for misfire detection to a lower level takes place in several stages with the magnitude of the individual threshold values lying between the magnitude of the first threshold value ($SW_1$) for misfire detection and the second threshold value ($SW_2$).

7. The method of claim 2, comprising the further steps of storing the cylinder individual equalization or correction factors (GL) after each desired-actual comparison of the rough running values (LUT) in a precontrol characteristic field; and, keeping the cylinder-individual equalization or correction factors (GL) unchanged after reducing the first threshold value ($SW_1$) for misfire detection to a lower level.

* * * * *